United States Patent
Godavarti et al.

(10) Patent No.: US 8,249,035 B2
(45) Date of Patent: Aug. 21, 2012

(54) METHOD AND SYSTEM FOR ENHANCED PARAMETER NEGOTIATION IN EVDO COMMUNICATION SYSTEMS

(75) Inventors: Satya Venkata Uma Kishore Godavarti, Karnataka (IN); Tirumala Sree Hari Vara Prasad Vadlapudi, Karnataka (IN); Agiwal Anil, Karnataka (IN)

(73) Assignee: Samsung Electronics Co., Ltd (KR)

( * ) Notice: Subject to any disclaimer, the term of this patent is extended or adjusted under 35 U.S.C. 154(b) by 878 days.

(21) Appl. No.: 11/781,654

(22) Filed: Jul. 23, 2007

(65) Prior Publication Data

US 2008/0022001 A1    Jan. 24, 2008

(30) Foreign Application Priority Data

Jul. 21, 2006 (IN) .......................... 1261/CHE/2006

(51) Int. Cl.
     *H04W 4/00*      (2009.01)
     *G06F 15/16*      (2006.01)

(52) U.S. Cl. ..................... 370/338; 370/328; 455/435.1; 709/228

(58) Field of Classification Search .................. 370/338, 370/328; 455/435.1; 709/228
See application file for complete search history.

(56) References Cited

U.S. PATENT DOCUMENTS

| | | | |
|---|---|---|---|
| 6,795,688 B1 * | 9/2004 | Plasson et al. ............... | 455/41.2 |
| 7,430,181 B1 * | 9/2008 | Hong ............................ | 370/254 |
| 7,441,021 B1 * | 10/2008 | Perry ........................... | 709/223 |
| 7,894,802 B2 * | 2/2011 | Schniedenharn ........... | 455/414.2 |
| 2002/0197985 A1 * | 12/2002 | Tourrilhes et al. ............. | 455/420 |
| 2003/0133494 A1 * | 7/2003 | Bender et al. ................. | 375/130 |
| 2004/0028081 A1 | 2/2004 | Chang et al. | |
| 2005/0018616 A1 * | 1/2005 | Schniedenharn .............. | 370/252 |
| 2005/0220095 A1 * | 10/2005 | Narayanan et al. ........... | 370/389 |
| 2005/0266895 A1 | 12/2005 | Okamoto et al. | |
| 2005/0286542 A1 * | 12/2005 | Shores et al. ................. | 370/401 |
| 2006/0104239 A1 | 5/2006 | Hono | |
| 2006/0133372 A1 * | 6/2006 | Cheong et al. ................ | 370/389 |
| 2006/0172707 A1 * | 8/2006 | Stern-Berkowitz et al. ......................... | 455/67.11 |
| 2006/0203787 A1 * | 9/2006 | Grech et al. .................. | 370/338 |
| 2007/0230419 A1 * | 10/2007 | Raman et al. ................. | 370/338 |
| 2007/0237098 A1 * | 10/2007 | Wang ............................ | 370/256 |
| 2008/0039055 A1 * | 2/2008 | Hannikainen et al. ...... | 455/414.1 |
| 2009/0135927 A1 * | 5/2009 | Prakash ........................ | 375/260 |

* cited by examiner

*Primary Examiner* — Christopher M Brandt
(74) *Attorney, Agent, or Firm* — The Farrell Law Firm, P.C.

(57) ABSTRACT

Disclosed herein is a technique for enhanced parameter negotiation in Evolution-Data Optimized (EVDO) communication systems that use Generic Configuration Protocol to negotiate session parameters or session attributes. The technique reduces the number of parameter negotiation cycles involved during the session configuration process. A new AlternateValueAllowed field is added in the attribute record. The Configuration Request message sent by the initiator allows the Configuration Response message responder to send the responder's preferred attribute value to the initiator, when the Configuration Request message does not contain the preferred attribute value of the responder. Such a modified attribute record structure obviates the need for multiple attribute negotiation cycles, and therefore saves session negotiation time.

12 Claims, 3 Drawing Sheets

METHOD AND SYSTEM FOR ENHANCED PARAMETER NEGOTIATION IN EVDO COMMUNICATION SYSTEMS

PRIORITY

This application claims priority to an application entitled Method and System for Enhanced Parameter Negotiation in EVDO Communication Systems, filed in the Indian Patent Office on Jul. 21, 2006 and assigned Serial No. 1261/CHE/2006, the contents of which are incorporated herein by reference.

BACKGROUND OF THE INVENTION

1. Field of the Invention

The present invention relates generally to EVolution-Data Optimized (EVDO) and its evolved communication systems, and in particular, to a system and method for reducing parameter negotiation cycles in EVDO which uses Generic Configuration Protocol to negotiate session parameters (attributes).

2. Description of the Related Art

The EVDO communication system consists of several protocols and applications that define the procedures to be followed by the Access Network (AN) and the Access Terminal (AT) to communicate with each other. Each protocol/application has several subtypes, wherein a subtype defines a distinct procedure to be used for the operation of that protocol/application. Each subtype contains several configurable attributes which govern its operation. The EVDO communication system is a procedure for negotiating and configuring the protocol/application subtypes and their corresponding attributes between the AT and AN. Configuration Request and Configuration Response messages are exchanged between the AT and AN, according to the generic configuration protocol, to negotiate protocol/application subtypes and their corresponding attributes.

The set of negotiated and configured protocol/application subtypes and the corresponding attributes constitutes an EVDO session. In other words, an EVDO session refers to a shared state between the AT and the AN. This shared state stores the protocols/applications and the protocol/application configurations that were negotiated and are used for communications between the AT and the AN. Session Configuration Protocol (SCP) defines the procedure to negotiate and configure multiple EVDO sessions.

During the session negotiation, protocols/applications use a Configuration Request message and a Configuration Response message to negotiate a mutually acceptable configuration. The initiator uses the Configuration Request message to provide the responder with a list of acceptable attribute values for each attribute. The responder uses the Configuration Response message to provide the initiator with the accepted attribute value for each attribute, choosing the accepted attribute value from the initiator's acceptable attribute value list. If none of the values received in the attribute list for an attribute are acceptable, then the responder will not sent any value for this attribute in the Configuration Response message. Both the AT and AN will continue to use the fall-back or default value for this attribute. The attribute negotiation between AT and AN is performed for various protocols and applications in the following two stages: Stage 1, which is an AT initiated parameter negotiation; and Stage 2, which is an AN initiated parameter negotiation.

The format of the Configuration Request and Configuration Response message used by the AT and AN during the parameter negotiation is shown in FIG. 1.

The descriptions of the fields of Configuration Request and Configuration Response message are as follows:

MessageID: The sender sets this field to 0x50 for Configuration Request Message. The sender sets this field to 0x51 for Configuration Response Message.

TransactionID: The sender increments this value for each new ConfigurationRequest message sent. The sender sets this value to the TransactionID field of the corresponding ConfigurationRequest message while sending Configuration Response message.

AttributeRecord: The attribute record defines a set of suggested values for a given attribute. The attribute record format is defined, such that if the recipient does not recognize the attribute, it can discard it and parse attribute records that follow this record. An attribute is one of the following three types: A Simple attribute, which contains a single value, an Attribute list, which contains multiple single values that are interpreted as different suggested values for the same attribute identifier, or a Complex attribute, which contains multiple values that together form a complex value for a particular attribute identifier Simple attributes are a special type of attribute list containing a single value. The type of the attribute is determined by the attribute identifier.

The sender of a ConfigurationResponse message selects an attribute-value from a ConfigurationRequest message by sending the attribute value if it is a simple attribute or a selected value out of an attribute list. Selection of complex-attributes is performed by sending the value identifier which identifies the complex value. If none of the values received in the attribute list for an attribute are acceptable, then the responder will not send any value for this attribute in the Configuration Response message.

The format of a simple attribute and complex attribute is shown in FIG. 2.

The descriptions of the fields of attribute record are as follows:

Simple Attribute Record:

Length: Length in octets of the attribute record, excluding the Length field.

AttributeID: Attribute identifiers are unique in the context of the protocol being configured.

AttributeValue: A suggested value for the attribute. Attribute value lengths are, in general, an integer number of octets. Attribute values have an explicit or implicit length indication (e.g., fixed length or null terminated strings) so that the recipient can successfully parse the record when more than one value is provided.

Reserved: The length of this field is the smallest value that will make the attribute record octet aligned. The sender sets this field to zero, while the receiver ignores this field.

Complex Attribute Record:

Length: Length in octets of the attribute record, excluding the Length field.

AttributeID: Attribute identifiers are unique in the context of the protocol being configured.

ValueID: It identifies the set of attribute values following this field. The sender increments this field for each new set of values for this complex attribute.

AttributeValue: A suggested value for the attribute. Attribute value lengths are in general an integer number of octets. Attribute values have an explicit or implicit length indication (e.g., fixed length or null terminated strings) so that the recipient can successfully parse the record when more than one value is provided.

Reserved: The length of this field is the smallest value that will make the attribute record octet aligned. The sender sets this field to zero, while the receiver ignores this field.

Limitations

In the AT initiated parameter negotiation, while sending ConfigurationResponse message, the AN has to select an attribute-value for an attribute ID from a ConfigurationRequest message received from the AT, by sending the selected attribute value from the received attribute list corresponding to the attribute ID. If the values received in the attribute list for an attribute ID are not acceptable, then the following occurs:

The AN has to send a configuration response message without any selected value for the attribute ID. Also, the AN is not allowed to send any other attribute value (other than the values received in the attribute list) which it supports for the attribute ID. This will trigger an initiation of configuration of the same attribute ID in AN initiated parameter negotiation leading to increase in session negotiation time.

1. In the AN initiated parameter negotiation while sending ConfigurationResponse message, the AT has to select an attribute-value for an attribute ID from a ConfigurationRequest message received from the AT, by sending the selected attribute value from the received attribute list corresponding to the attribute ID. If the values received in the attribute list for an attribute ID are not acceptable, then the following occurs: The AT has to send a configuration response message without any selected value for the attribute ID. Also, the AT is not allowed to send any other attribute value (other than the values received in the attribute list) which it supports for the attribute ID.

This may trigger a new session negotiation cycle leading to an increase in session negotiation time if the AT needs to negotiate any attributes as a result of some attribute value change in the AN initiated state.

Accordingly, there is need in the art for techniques that allow the responder (sender of Configuration Response message) to send its preferred value to the initiator (sender of Configuration Request message), if the responder's preferred value is not received in the Configuration Request message and is allowed to do so.

SUMMARY OF THE INVENTION

An aspect of the present invention is to a technique for enhanced parameter negotiation in Evolution-Data Optimized (EVDO) communication systems.

For EVDO systems that use Generic Configuration Protocol to negotiate session parameters or session attributes, a technique is described that reduces the number of parameter negotiation cycles involved during the session configuration process. A new field, 'AlternateValueAllowed' is added in the attribute record. The Configuration Request message sent by the initiator allows the Configuration Response message responder to send the responder's preferred attribute value to the initiator, when the Configuration Request message does not contain the preferred attribute value of the responder. Such a modified attribute record structure obviates the need for multiple attribute negotiation cycles, and therefore saves session negotiation time.

Accordingly, the present invention discloses a method for enhanced parameter negotiation in EVDO communication systems, including adding a new field, 'AlternateValueAllowed' in attribute record wherein a Configuration Request message sent by an initiator allows a Configuration Response message responder to send the responder's preferred attribute value to the initiator, if a Configuration Request message does not contain the preferred attribute value of the responder.

The present invention discloses a system for enhanced parameter negotiation in EVDO communication systems, including a modified attribute record allowing a responder to send a new attribute value which the responder supports for an attribute ID, and an initiator allowing the responder to send a new attribute value other than those received in the attribute list, which the responder and initiator supports for the attribute ID.

BRIEF DESCRIPTION OF THE DRAWINGS

The foregoing and other objects, features and advantages of the present invention will become more readily apparent from the detailed description taken in conjunction with the following drawings, in which.

DETAILED DESCRIPTION OF THE PREFERRED EMBODIMENTS

The preferred embodiments of the present invention will now be explained with reference to the accompanying drawings. It should be understood however that the disclosed embodiments are merely preferred, and may be embodied in various forms. The following description and drawings are not to be construed as limiting the invention and numerous specific details are described to provide a thorough understanding of the present invention, as the basis for the claims and for teaching one skilled in the art how to make and/or use the invention. However in certain instances, well-known or conventional details are not described for the sake of clarity and conciseness.

In the present invention, the following terms are used:

Access Network (AN): The network equipment which provides data connectivity between a packet switched data network (typically the Internet) and the access terminals Access Terminal (AT): A device providing data connectivity to a user. An access terminal may be connected to a computing device such as a laptop personal computer or it may be a self-contained data device such as a personal digital assistant. An access terminal is equivalent to a mobile station.

EV-DO: CDMA2000 1x EVolution-Data Optimized system.

Figure 1:
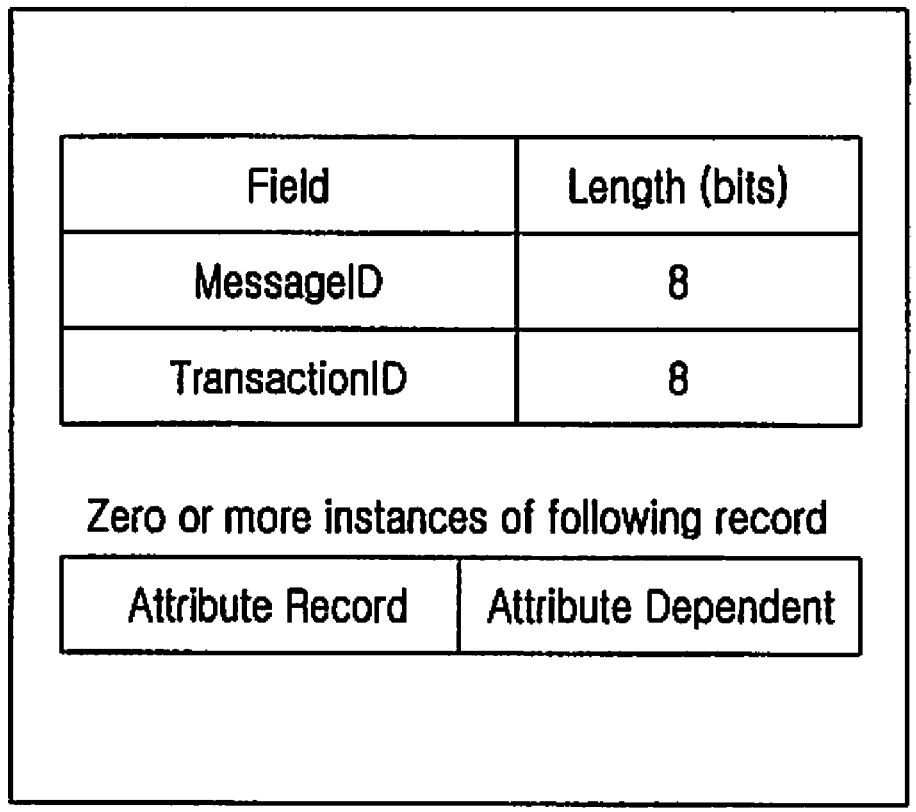
FIG. 1 illustrates a conventional message structure for configuration request/response.
Figure 2:
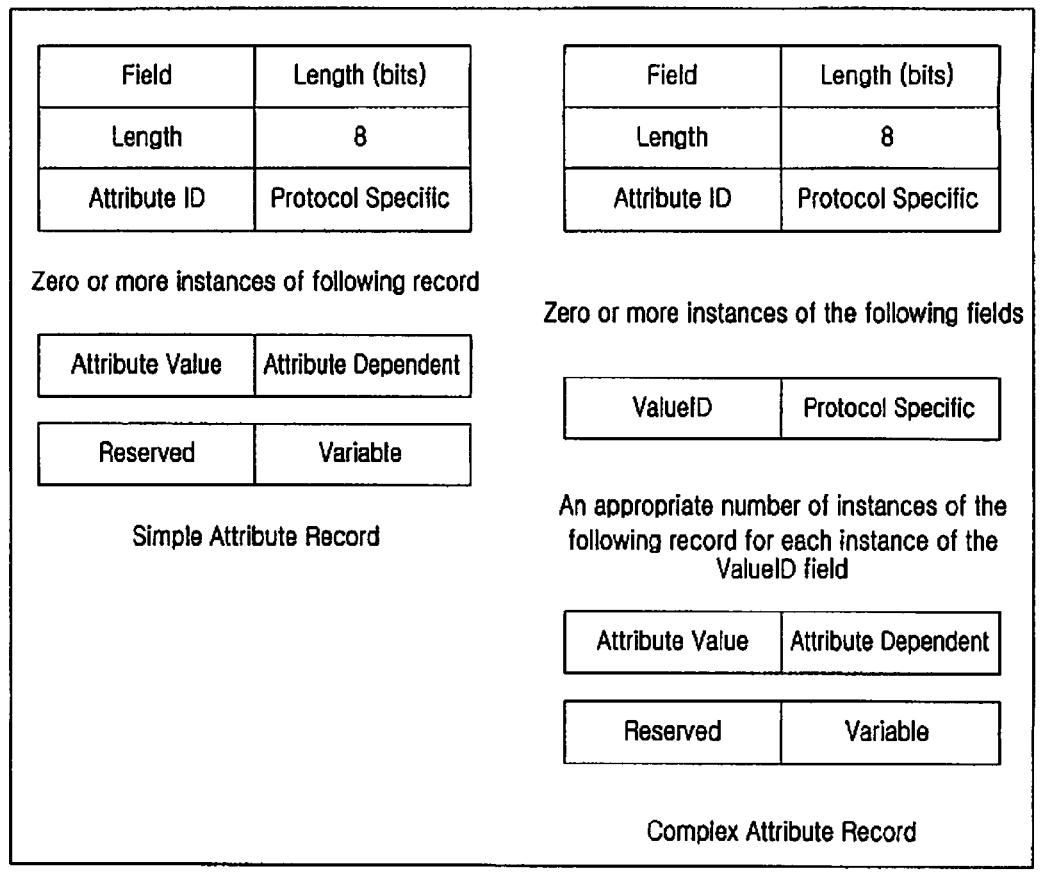
FIG. 2 illustrates a conventional attribute record structure for simple and complex attributes.
Figure 3:
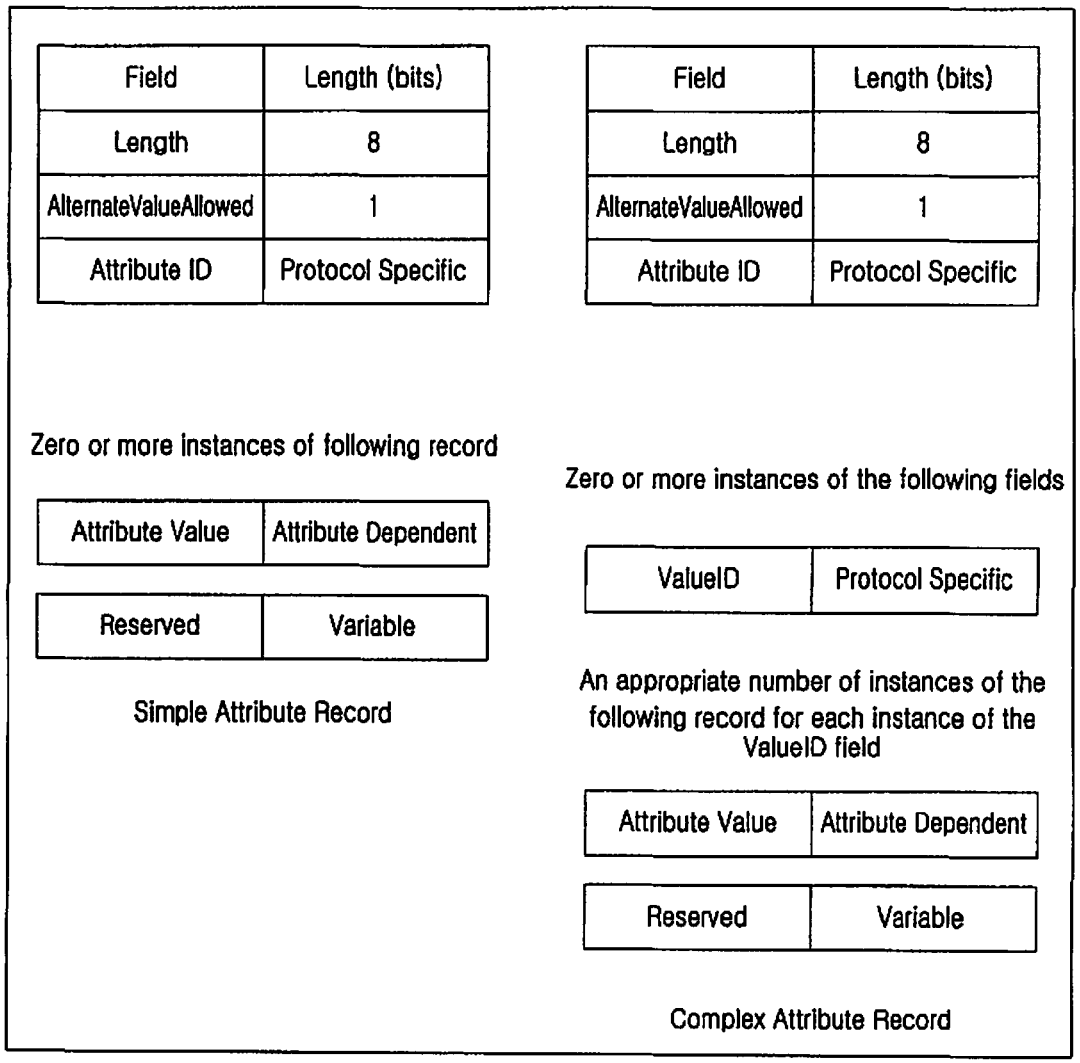
FIG. 3 illustrates an attribute record structure according to the present invention

The attribute record for simple and complex attribute is modified such that the initiator (sender of Configuration Request message) allows the responder (sender of Configuration Response message) to send its' preferred value to the initiator if the responder's preferred value is not received in the Configuration Request message. A new field 'AlternateValueAllowed' is added in both the simple and complex attribute record. The new attribute records are as illustrated in FIG. 3.

The new field 'AlternateValueAllowed' is interpreted as follows:

If the AlternateValueAllowed bit is set to '1', and if the responder accepts an attribute value from a list of attribute values received in the Configuration Request message, then it sends selected attribute value or corresponding Value ID (for complex attribute) in the Configuration Response message.

However, if the AlternateValueAllowed bit is set to '1', and if the responder does not accept any attribute value from a list of attribute values received in the Configuration Request message, then it sends a Configuration Response message with any other attribute value that the responder prefers for that attribute ID (for Simple attribute). The attribute value sent should be within the initiator's capability. Or, it sends a Configuration Response message with a reserved ValueID and any other attribute value that the responder prefers for that attribute ID (for complex attribute). The attribute value sent should be within the initiator's capability.

The responder sends the Configuration Response message with an attribute value that the responder prefers for that attribute ID when no attribute values are received in the Configuration Request message (for simple attribute), or with a reserved ValueID and an attribute value that the responder prefers for that attribute ID when no attribute values are received in the Configuration Request message (for complex attribute).

The initiator has to accept any value (other than the values proposed by the initiator) sent by the responder.

If the AlternateValueAllowed bit is set to '0', and if the responder accepts an attribute value from the list of attribute values received in the Configuration Request message, then the responder sends selected attribute value (for simple attribute) or corresponding Value ID (for complex attribute) in the Configuration Response message.

However, If the AlternateValueAllowed bit is set to '0', and if the responder does not accept any attribute value from the list of attribute values received in the Configuration Request message, then the responder sends a Configuration Response message by not including that attribute ID.

At least the following advantages are realized in the present invention.

First, the modified attribute records allow the responder to send a new attribute value which it supports for the attribute ID (other than those received in attribute list).

Second, the initiator can allow the responder to send a new attribute value (other than those received in attribute list), which the responder and initiator supports for the attribute ID.

Third, the modified attribute records avoids multiples rounds (once initiated by the AT and another initiated by the AN) of attribute negotiation for the same attribute.

Fourth, the modified attribute record reduces session negotiation time.

The manner and process of making and using the present invention has been provided in such a full, clear, concise and exact terms as to enable to any person skilled in the art to which it pertains to make and use this invention. New embodiments in particular, which also lie within the scope of the invention can be created, in which different details of the different examples can in a purposeful way be combined with one another.

This invention is modifiable, and alternate constructions from that disclosed above which are fully equivalent may be provided. Consequently, it is not the intention to limit this invention to the particular embodiment disclosed. On the contrary, the intention is to cover all modifications and alternate constructions coming within the spirit and scope of the invention as generally expressed by the following claims.

What is claimed is:

1. A method for enhanced parameter negotiation in a communication system, comprising:

receiving a Configuration Request message including an AlternateValueAllowed field in an attribute record from an initiator;

determining by a responder, the AlternateValueAllowed field and an attribute value list included in the Configuration Request message; and transmitting, by the responder, a Configuration Response message with a preferred attribute value of the responder to the initiator, when a value of the AlternateValueAllowed field indicates that alternate values are allowed and when the Configuration Request message does not include the preferred attribute value of the responder in the attribute value list.

2. The method according to claim 1, wherein if the value of the AlternateValueAllowed field is set to 1 and the responder accepts an attribute value from the attribute value list received in the Configuration Request message, then a selected attribute value that is a corresponding Value IDentifier (ID) for a complex attribute is sent in the Configuration Response message.

3. The method according to claim 1, wherein if the value of the AlternateValueAllowed field is set to 1 and if the responder does not accept any attribute value from the attribute value list received in the Configuration Request message, then the responder sends the configuration Response message with any other attribute value for a Simple attribute that responder prefers.

4. The method according to claim 1 wherein if the value of the AlternateValueAllowed field is set to 1 and if the responder does not accept any attribute value from the attribute value list received in the Configuration Request message, then the configuration Response message with a reserved Value Identifier (ID) and any other attribute value for a complex attribute ID that responder prefers.

5. The method according to claim 1, wherein if the value of the AlternateValueAllowed field is set to 1, then the responder sends the Configuration Response message with an attribute value that the responder prefers when no attribute values are received in the Configuration Request message for a simple attribute.

6. The method according to claim 1, wherein if the value of the AlternateValueAllowed field is set to 1, then the responder sends the Configuration Response message with an attribute Identifier that is a reserved Value ID and an attribute value that the responder prefers for the attribute ID when no attribute values are received in the Configuration Request message for a complex attribute.

7. The method according to claim 1, wherein if the value of the AlternateValueAllowed field is set to 1, the initiator accepts any attribute value sent by the responder.

8. The method according to claim 1, wherein if the value of the AlternateValueAllowed field is set to 0, and if the responder accepts an attribute value from the attribute value list received in the Configuration Request message, then the responder sends a selected attribute value for a simple attribute or a corresponding Value Identifier (ID) for a complex attribute in the Configuration Response message.

9. The method according to claim 1, wherein if the value of the AlternateValueAllowed field is set to 0, and if the responder does not accept any attribute value from the attribute value list received in the Configuration Request message, then the responder sends the Configuration Response message by not including the attribute value.

10. A system for enhanced parameter negotiation in a communication system, comprising:

an initiator for sending a Configuration Request message including an AlternateValueAllowed field in an attribute record; and a responder for receiving the Configuration Request message including the AlternateValueAllowed field, determining the AlternateValueAllowed field and an attribute value list included in the Configuration Request message, and transmitting a Configuration Response message with a preferred attribute value of the responder to the initiator, when a value of the AlternateValueAllowed field indicates that alternate values are allowed and when the Configuration Request message does not include the preferred attribute value of the responder in the attribute value list.

11. The method according to claim 1, wherein the responder's preferred attribute value is within the initiator's capability.

12. The system according to claim 10, wherein the responder's preferred attribute value is within the initiator's capability.

* * * * *